C. W. SMITH.
REVERSIBLE DISK ATTACHMENT FOR CORN PLOWS.
APPLICATION FILED MAY 21, 1919.
1,376,232.
Patented Apr. 26, 1921.
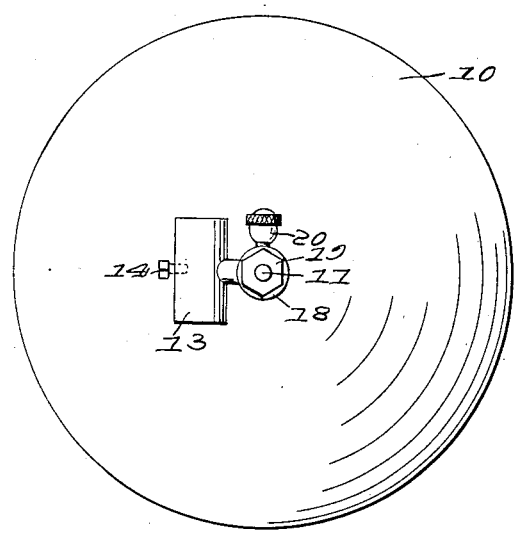
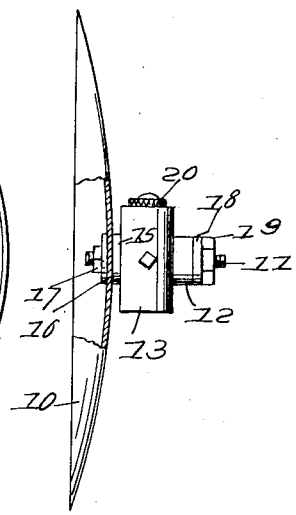
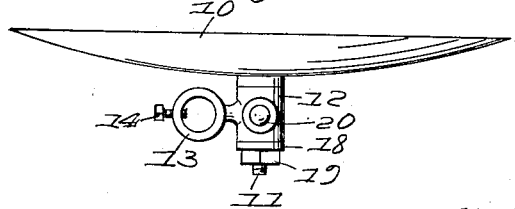
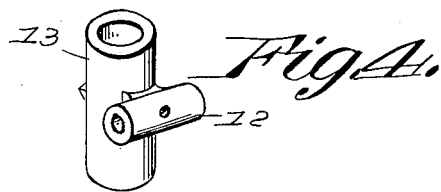
Inventor
C.W. Smith,
By
Attorney

UNITED STATES PATENT OFFICE.

CHARLES W. SMITH, OF CHAMBERSBURG, ILLINOIS.

REVERSIBLE-DISK ATTACHMENT FOR CORN-PLOWS.

1,376,232.     Specification of Letters Patent.     Patented Apr. 26, 1921.

Application filed May 21, 1919. Serial No. 298,725.

*To all whom it may concern:*

Be it known that I, CHARLES W. SMITH, citizen of the United States of America, residing at Chambersburg, in the county of Pike and State of Illinois, have invented new and useful Improvements in Reversible-Disk Attachments for Corn-Plows, of which the following is a specification.

The object of the invention is to provide a disk plow adapted for use as a substitute for the ordinary shovel plow now commonly used in cultivating corn and designed to replace worn shovel plows in machines already in use, with the added advantage that the disk may be reversed to throw the soil either toward or from the row of corn, or successive disks may be disposed to throw the soil respectively from and toward the row, the disk may be adjusted to bring fresh portions of the cutting edge into operative position, and will act as a means of cutting and removing weeds and vines as distinguished from the operation of the ordinary corn cultivating shovel.

To this end the invention consists in a construction and combination of parts hereinafter set forth, it being understood that changes in proportion and details may be resorted to within the scope of the appended claims without departing from the principles involved.

In the drawings:

Figure 1 is a face view of a reversible disk embodying the invention.

Fig. 2 is an edge view partly broken away, of the same.

Fig. 3 is a plan view.

Fig. 4 is a detail view of the disk mounting.

The disk 10 is connected by means of a bolt 11 with a thimble 12 forming one element of a mounting designed to be applied to the standard of an ordinary corn cultivating plow, said mounting embodying as a further essential element, the sleeve 13 designed to receive the plow standard and adapted to be locked in place thereon by means of a set screw 14 or the equivalent thereof. Washers 15 and 16 may be arranged exteriorly and interiorly of the disk respectively for contact with the end of the thimble 12 and the securing nut 17 which is threaded upon the inner extremity of the bolt 11, while a corresponding washer 18 may as indicated, be employed at the outer end of the thimble for contact with the nut 19 which is threaded upon the outer end of said bolt. Obviously the disk may be reversed in position with reference to the thimble, or applied to either end thereof, and may be held in either position by the means above described and consisting of the bolt which extends through the thimble and is terminally engaged by the nuts 17 and 19, and as obviously the mounting may be reversed in position with reference to the standard engaged by the sleeve 13, so as to arrange for its operation in any desired position with reference to the plane of the standard, and when it is desired that the disk shall rotate the bolt 11 will serve as a spindle and may be suitably lubricated in the bearing represented by the thimble 12 by means of oil supplied by the cup 20.

In operation it has been found that the disk serves as a means for shifting the soil either from or toward the row of corn with equal or greater facility and efficiency than the shovels ordinarily employed in this connection and as above noted there is the added advantage in the use of the disks that weeds and vines are cut and thus removed as obstacles instead of being merely forced aside as when the ordinary shovel is used, and the reversibility of the disk adapts it to be arranged at any desired angle to the direction of movement of the plow and in such a relation to the line of progress as to throw the soil either toward or from the row, to the ultimate end that a more satisfactory cultivation of the growth is effected without the necessity of repeatedly traversing the same row.

Claims:—

1. The combination with a cultivator disk of a mounting provided with a thimble constituting a bearing for the disk spindle, and a sleeve rigidly related with said thimble with its axis at right angles to that of the thimble and adapted for engagement with a plow standard.

2. The combination with a cultivator disk of a mounting comprising a sleeve and a thimble rigidly connected in axially angular relation, the sleeve being provided with means for engagement with a plow standard, and a spindle bolt mounted in said thimble and provided terminally with means for engagement respectively with said disk and the opposite end of the thimble.

3. The combination with a cultivator disk of a mounting consisting of a sleeve and a thimble rigidly connected in axially angular relation, said sleeve being adapted for engagement with a plow standard, a spindle bolt extending through the thimble and provided at one end with means for engaging the disk, and lubricating means in connection with the bore of said thimble.

In testimony whereof I affix my signature.

CHARLES W. SMITH.